(12) United States Patent
Ménard et al.

(10) Patent No.: US 11,422,088 B2
(45) Date of Patent: Aug. 23, 2022

(54) BROADBAND THZ RECEIVER USING THICK PATTERNED SEMICONDUCTOR CRYSTALS

(71) Applicant: OZ Optics Ltd., Ottawa (CA)

(72) Inventors: Jean-Michel Ménard, Ottawa (CA); Alexei Halpin, Ottawa (CA); Wei Cui, Ottawa (CA)

(73) Assignee: OZ OPTICS LTD., Ottawa (CA)

( * ) Notice: Subject to any disclaimer, the term of this patent is extended or adjusted under 35 U.S.C. 154(b) by 230 days.

(21) Appl. No.: 16/711,835

(22) Filed: Dec. 12, 2019

(65) Prior Publication Data

US 2020/0191710 A1 Jun. 18, 2020

(30) Foreign Application Priority Data

Dec. 12, 2018 (CA) .................................. CA 3027228

(51) Int. Cl.
| | | |
|---|---|---|
| *G01N 21/35* | (2014.01) | |
| *G01N 21/359* | (2014.01) | |
| *G02F 1/35* | (2006.01) | |
| *G01N 21/3581* | (2014.01) | |
| *G02B 5/04* | (2006.01) | |

(52) U.S. Cl.
CPC ....... *G01N 21/359* (2013.01); *G01N 21/3581* (2013.01); *G02F 1/35* (2013.01); *G02B 5/04* (2013.01)

(58) Field of Classification Search
CPC .... G01N 21/359; G01N 21/3581; G02F 1/35; G02B 5/04
See application file for complete search history.

(56) References Cited

U.S. PATENT DOCUMENTS

| | | | |
|---|---|---|---|
| 6,388,799 B1* | 5/2002 | Arnone .............. | G01N 21/3581 359/326 |
| 2015/0248047 A1* | 9/2015 | Chakraborty ........... | G02F 1/365 359/278 |

* cited by examiner

*Primary Examiner* — Hugh Maupin
(74) *Attorney, Agent, or Firm* — WCF IP

(57) ABSTRACT

There is provided a design of a device consisting of a patterned semiconductor material to provide enhanced detection bandwidth and efficiency of terahertz (THz) pulses with an electro-optic sampling. One device has a semiconductor crystal having a patterned grating on a surface of the semiconductor. In a system, there could optionally be a quarter-wave plate after the semiconductor crystal, followed by a prism. A pair of balanced photodiodes can optionally be provided after the prism. A pulse laser having a NIR beam and THz beam is sent through the semiconductor crystal to the quarter-wave plate to the prism to the photodiodes, wherein the patterned grating on the semiconductor crystal diffracts the NIR beam while the THz remains unaffected. The photodiodes can detect the result.

8 Claims, 2 Drawing Sheets

BROADBAND THZ RECEIVER USING THICK PATTERNED SEMICONDUCTOR CRYSTALS

TECHNICAL FIELD

The present invention relates to the combination of patterned semiconductor crystals and femtosecond laser sources for broadband detection of THz transients.

BACKGROUND OF THE INVENTION

The efficient detection of THz radiation at frequencies higher than 2 THz relies on technology beyond that of photoconductive antennas or switches. Semiconductor crystals possessing a second-order optical nonlinearity are typically employed for this purpose, where electro-optic sampling allows detection of phase-locked THz transients over several frequency ranges through ellipsometric detection techniques. The typical drawback of such crystals lie in the fact that their operating bandwidths and sensitivities are inversely related. As such, different crystalline materials, possessing different thicknesses, must be used for different spectral ranges. These restrictions arise due to the material properties of individual crystals, and can be overcome by complex alignment or noncollinear geometries, however, since THz generation is invisible and difficult to detect this option is not easily scalable.

SUMMARY

In one aspect of the present invention there is provided a method and system for achieving a correct noncollinear alignment of the near-infrared pulse through detection of the THz pulse through a diffraction grating patterned on the surface of the semiconductor. The grating allows a simultaneous increase of the operating bandwidth and sensitivity of the electro-optic sampling setup, such that thick crystals can be used without compromising the spectral detection bandwidth.

In a further aspect there is provided a semiconductor crystal, oriented along the <110> axis. In one example, the crystal is patterned using conventional electron beam lithography techniques, to deflect an incident NIR at an angle relative to the copropagating THz beam. The deflection angle, and thus spacing between the lines in the fabricated grating, can be selected based on the material in use. In one example, a Gallium Phosphide is used where the grating pitch of 1.635 micrometers serves to nearly double the bandwidth and efficiency of THz detection.

In one aspect, there is provided a device comprising a semiconductor crystal having a patterned grating on a surface of the semiconductor.

In a further aspect, there is provided a device further comprising a quarter-wave plate after the semiconductor crystal, followed by a prism. In yet a further aspect, a pair of balanced photodiodes follows after the prism.

In yet a further aspect, the device further comprises a pulse laser wherein the pulse having a NIR beam and THz beam is sent through the semiconductor crystal to the quarter-wave plate to the prism to the photodiodes, wherein the patterned grating on the semiconductor crystal diffracts the NIR beam while the THz beam remains unaffected.

In a further aspect, the device has a patterned grating which is a phase grating having a rectangular pattern with a period of 1.635 micrometers.

In yet a further aspect the device has a patterned grating which is a chirped grating to further broaden the detection bandwidth and provide spatial multiplexing for improved signal detection efficiency.

BRIEF DESCRIPTION OF THE DRAWINGS

The invention will be better understood with reference to the following drawings showing exemplary embodiments in which.

DESCRIPTION OF THE PREFERRED EMBODIMENTS

Figure 1:
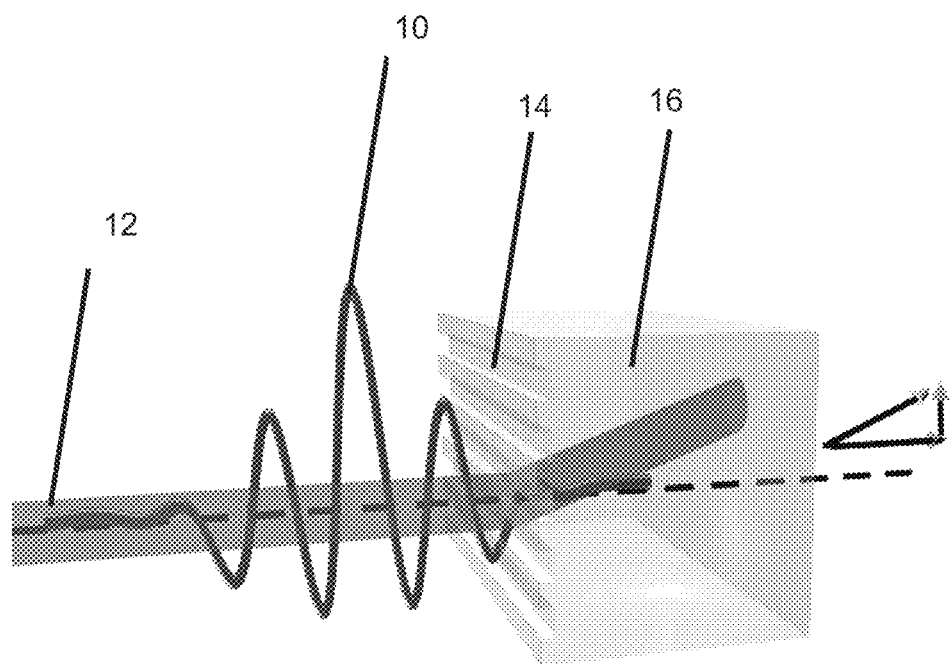
FIG. 1 shows a schematic diagram of the nonlinear interaction between the THz pulse and the near-infrared detection pulse as it is refracted by the phase grating located on the surface of the semiconductor.

One example embodiment is shown in FIG. 1 which illustrates a schematic diagram of the nonlinear interaction between the THz pulse 10 and the near-infrared detection pulse 12 as it is refracted by the phase grating 14 located on the surface of the semiconductor 16.

In a further example embodiment, there is provided a device consisting of a patterned semiconductor material to provide enhanced detection bandwidth and efficiency of terahertz (THz) pulses with an electro-optic sampling. As shown in FIG. 1, two beams are input to the device, one at THz and near-infrared (NIR) frequencies. Standard electro-optic sampling relies on a nonlinear optical interactions between these two collinear beams. The present invention uses a periodic surface modulation, or phase grating, on the electro-optic detection crystal to diffract the NIR beam while the THz, at a longer wavelength, remains unaffected. This non-collinear geometry allows phase-matching conditions to be satisfied over a broader spectral range and enables broadband THz detection via electro-optic sampling. It also allows the use of a thick semiconductor crystal that maximizes the nonlinear interaction length between the THz and the NIR pulse and, as a result, enhances detection sensitivity without compromising the detection bandwidth. Moreover, the grating can be oriented so that the p-polarized near-infrared signal generated as a result of the nonlinear interaction with the THz pulse has a lower Fresnel reflection coefficient at the back surface of the grating than the background s-polarized component. This further enhances the detection sensitivity of the design. The present invention can be generalized to several materials and relies on conventional lithographic fabrication processes.

Figure 2:
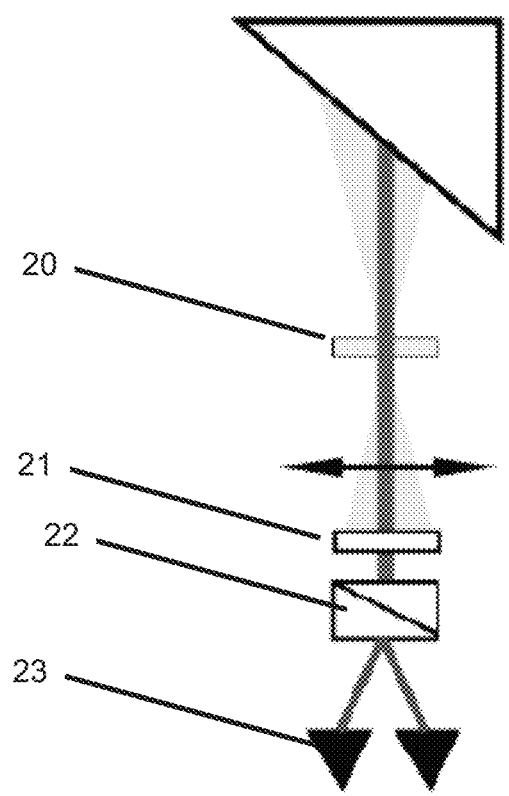
FIG. 2 shows an electro-optic sampling scheme including a spatially modulated semiconductor for broadband and sensitive THz detection.

In a further example embodiment, FIG. 2 shows an electro-optic sampling scheme including the spatially modulated semiconductor (GaP) 20 for broadband and sensitive THz detection. Following the semiconductor crystal, the beam passes through a quarter-wave plate (L/4) 21 and a Wollaston prism (WP) 22 before it is detected by a pair of balanced photodiodes (BPD) 23.

One embodiment involves the patterning of a rectangular phase grating with a period of 1.635 micrometers into a Gallium Phosphide semiconductor. This embodiment allows for nonlinear optical detection of THz radiation as shown in FIG. 1.

The diffraction of NIR light at an appropriate angle improves phase-matching with THz radiation en route to the electro-optic sampling (EOS) configuration shown in FIG. 2.

Variants can exist, for example, in the use of different grating periods and other types of semiconductor crystals. The period of the grating can be defined on the basis of the material and frequency range of interest.

In a further example embodiment there is provided a device comprising a patterned semiconductor crystal that deflects incident NIR radiation to improve phase-matching for nonlinear optical detection of THz radiation through electro-optic sampling. In a further aspect, the use of a linear phase-grating exploits diffraction for improving phase-matching. In yet a further aspect, the use of alternative patterns, such as chirped gratings further broadens the detection bandwidth and provides spatial multiplexing for improved signal detection efficiency.

It will be appreciated by one skilled in the art that variants can exist in the above-described arrangements and applications. The scope of the claims should not be limited by the preferred embodiments set forth in the examples, but should be given the broadest interpretation consistent with the description as a whole.

The invention claimed is:

1. An optical system for detection of THz radiation comprising:
    a semiconductor crystal having a patterned grating on a surface of the semiconductor crystal, wherein upon impinging of a first incident beam in the THz frequency range and a second incident beam in the NIR frequency range, the grating is configured to enhance detection of the first incident beam by permitting the first incident beam to remain unaffected through the grating and to diffract the second incident beam; and
    a pair of balanced photodiodes for detection of the second incident beam.

2. The optical system of claim 1 wherein the grating enables a non-collinear geometry between the first incident beam and second incident beam within the crystal, which allows satisfaction of phase-matching conditions over a broader spectral range, in comparison to a schematic without the patterned grating, to enable broadband THz detection via electro-optic sampling.

3. The optical system of claim 1 further comprising a quarter-wave plate after the semiconductor crystal, followed by a prism.

4. The optical system of claim 3 wherein the prism is a Wollaston prism.

5. The optical system of claim 3 wherein the pair of balanced photodiodes are arranged after the prism.

6. The optical system of claim 3 further comprising a pulsed laser which emits the first incident beam and/or the second incident beam.

7. The optical system of claim 1 wherein the patterned grating is a phase grating having a rectangular pattern with a period of 1.635 micrometers.

8. The optical device of claim 1 wherein the patterned grating is a chirped grating to further broaden the detection bandwidth and provide spatial multiplexing for improved signal detection efficiency.

* * * * *